United States Patent [19]

Baudin et al.

[11] 4,094,830

[45] June 13, 1978

[54] GRAFTING OF VINYLAROMATIC COMPOUNDS BY CATIONIC POLYMERIZATION ON NON-HALOGENATED DOUBLE-BONDED CHAINS

[75] Inventors: Cecile Baudin, Kremlin-Bicetre; Mihajlo Miskovic; Alain Polton, both of Paris; Pierre Sigwalt, St Michel-sur-Orge, all of France

[73] Assignee: Societe Chimique des Charbonnages, Paris, France

[21] Appl. No.: 631,943

[22] Filed: Nov. 14, 1975

[30] Foreign Application Priority Data

Nov. 18, 1974 Luxembourg .......................... 71297

[51] Int. Cl.$^2$ ..................... C08E 19/28; C08F 253/00; C08F 279/02; C08F 279/00
[52] U.S. Cl. ..................... 260/4 R; 260/27 R; 260/878 R; 260/880 R
[58] Field of Search ................. 260/4 R, 27 R, 878 R, 260/880 R

[56] References Cited

U.S. PATENT DOCUMENTS

| | | | |
|---|---|---|---|
| 3,489,822 | 1/1970 | Witt et al. | 260/878 R |
| 3,538,190 | 11/1970 | Meredith et al. | 260/878 R |
| 3,639,511 | 2/1972 | Kreibich | 260/878 R |
| 3,849,518 | 11/1974 | Severini et al. | 260/878 R |
| 3,875,260 | 4/1975 | Patel et al. | 260/878 R |
| 3,904,708 | 9/1975 | Kennedy et al. | 260/880 R |
| 3,933,942 | 1/1976 | Kennedy et al. | 260/880 R |
| 4,020,127 | 4/1977 | Kennedy et al. | 260/878 R |

FOREIGN PATENT DOCUMENTS 1,009,719   11/1965   United Kingdom ........... 260/878 R

*Primary Examiner*—Alan Holler
*Attorney, Agent, or Firm*—Dennison, Dennison, Meserole & Pollack

[57] ABSTRACT

This invention relates to copolymers of a macromolecular compound having a non-halogenated and double-bonded chain and of a vinylaromatic monomer and the process for obtaining same. The reaction between the macromolecular compound and the vinylaromatic monomer takes place at a temperature of between $-80°$ C and $+40°$ C in the presence of $5.10^{-4}$ to $5.10^{-2}$ mol/l of a Lewis acid initiator and possibly in the presence of a co-initiator. These copolymers obtained by cationic grafting are thermoplastics elastomers.

4 Claims, No Drawings

GRAFTING OF VINYLAROMATIC COMPOUNDS BY CATIONIC POLYMERIZATION ON NON-HALOGENATED DOUBLE-BONDED CHAINS

The present invention is concerned with a new method for grafting Vinylaromatic compounds by cationic polymerization on non halogenated double-bonded chains.

Grafting of vinylaromatic compounds on double-bonded halogenated elastomers is well known. This method which also leads to synthesizing physically interlaced thermoplastic elastomers has been described for example in British Pat. No. 1 174 323 and in XXIII IUPAC, Congress on Macromolecular Chemistry — BOSTON 1971, Vol. I — page 105.

Cationic grafting, especially for styrene, is based on the fact that in certain experimental conditions the initiation of a polymerization can only take place in the presence of a co-initiator, for example an alkylchloride, which provides the necessary positive group:

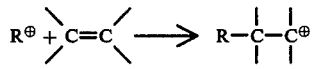

An elastomer with reactive sites such as chlorobutyl rubber whose allylic chlorine atoms are very reactive can be used as a co-initiator. The reactivity of these sites leads to the make-up of a macromolecular polycation capable of initiating the polymerization of styrene and the setting-up of grafts. The reaction can be schematized as:

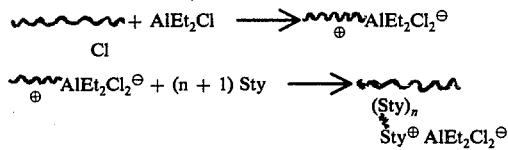

In order to obtain interesting materials, grafting yields should be quantitative and there should be no homopolymer but anyway when polystyrene is used as a thermoplastic phase these materials cannot be used above the temperature of 70° C as a consequence of the yield value of polystyrene.

In fact the presence of a non grafted elastomer or the presence of an elastomer having a single graft is the only impeachment since such a macromolecule forms an uninterlaced pending chain. The presence of a certain proportion of a thermoplastic homopolymer is not desirable but has less influence upon mechanical properties since it helps to the make-up of thermoplastic fields.

In the field of cationic grafting synthesis, recent work concerned with the grafting of polyisobutene on chloromethylpolystyrene can also be pointed out (International Symposium on cationic polymerization, ROUEN 1973). These compounds do not constitute thermoplastic elastomers however, since their elastomeric chains are pending.

The grafting methods previously known always use halogenated polymers and more particularly halogenated elastomers to graft monomers able to be cationically polymerized.

A brief analysis of the prior art cited above shows that, for cationic grafting reactions between elastomeric macromolecules and vinylaromatic polymers, it was necessary to use elastomers having halogenated groups which could be activated and could form carbocations acting like grafting sites. Activation of halogens like chlorine could be performed by Lewis acids which as tin tetrachloride or organo-chloroaluminic compounds.

However the resulting copolymers, which are more particularly sequenced copolymers, may have a molecular weight lower than that of the starting elastomer. It is especially the case when there is an important concentration of the organo-aluminic initiator.

Moreover it has been found that in certain cases the resulting copolymer was interlaced due to side reactions which are concurrent with the grafting mechanism using an initiator. When it occurs the interlacing is generally rapid and it happens during the few seconds after the introduction of the initiator and before the end of the polymerization. A partial interlacing may sometimes happen and form swollen insoluble agglomerates. At last separating the unreacted halogenated elastomer, the grafted copolymer and the polymer of the vinylaromatic compound is in most cases the cause of great difficulties.

The present invention relates to a process to yield, by way of grafting, copolymers which are free of the disadvantages previously mentioned about the prior art. The invention also relates to a process using easily available raw materials, especially elastomeric products copiously available on the market, to yield these copolymers.

The invention therefore concerns a process for the obtention of copolymers by way of grafting, characterized in that (i) a macromolecular compound having a non-halogenated and double-bonded chain and (ii) at least one vinylaromatic monomer able to be polymerized are brought together in cationic polymerization conditions. The chain of the macromolecular compound is preferably an elastomeric chain.

Double-bonded non-halogenated elastomeric chains which can be used are natural rubber, polybutadiene, butyl rubber or an E.P.D.M. elastomer, i.e. a terpolymer ethylene-propylene-diene monomer, the diene monomer being for example ethylidene-norbornene, dicyclopentadiene or hexadiene-1.4. Unsaturated elastomers having pending double-bonds are preferred as being oxidation-resistant and as they lead to copolymers which can still be used at elevated temperatures.

As a particularly preferred example of double-bonded elastomeric chains could be cited a terpolymer comprising (a) two monoolefins such as ethylene, propylene and butene 1 and (b) a non conjugated diene such as propadiene, methyl-4-pentadiene-1.4, methylene-norbornene and ethylidene-norbornene, which can provide vinylidenic bonds. Such terpolymers have a particular grafting ability without any chance of propagation or interlacing.

Vinylaromatic compounds which can be used for grafting are indene, styrene and its derivatives such as α-methylstyrene; indene will be preferably used along or together with styrene or α-methylstyrene to yield copolymeric grafts. Indene with a purity superior or equal to 99.5% is preferably required to yield copolymers having interesting properties. The cationic polymerization reaction leading to the grating of vinylaromatic compounds on elastomeric chains can be intitiated by Lewis acids in the presence of a co-initiator. As examples of Lewis acids can be cited, titanium tetrachloride, butoxy-trichlorotitanium, organohalogenoaluminic compounds and more particularly organochloroaluminic compounds such as monochlorodiethylaluminium, dichloromonoethylaluminium, boron trifluoride and boron trichloride.

Co-initiators which can be used are alkylchlorides or alkylarylchlorides such as tertiobutylchloride or benzylchloride. According to the initiator, the co-initiator is not always required. For example an organoaluminic compound having more than one halogenated substituent, such as dichloromonoethylaluminium, can initiate the reaction on its own.

The reaction according to the invention is effected in a solvent or in a mixture of solvents. A mixture of solvents is preferred to yield a compromise between the different solubilities of the polymers and to control the chain-transfer reactions. The couple of solvents which is used comprises an hydrocarbon such as heptane or methylcyclohexane and a hydrocarbon halogenated derivative selected from methylene chloride, methylchloride, dichloro-1.1-ethane, ethylchloride and dichloro-1.2-ethane. The concentration of the initiator should be of course sufficient to allow a reaction but according to the invention this concentration should be as low as possible to avoid breaking of the chains. It normally stands between $5 \cdot 10^{-4}$ and $5 \cdot 10^{-2}$ mole/l. The man skilled in the art will determine with help of routine experiments the suitable concentration of the initiator in every case, this concentration being just sufficient to allow the grafting reaction. The reaction temperature is between $-80°$ C and $+40°$ C.

All these experimental conditions can be determined of course by the man skilled in the art for each grafting to be performed. There should be operated, in a known manner, at the atmospheric pressure under an inert atmosphere to avoid destruction of the initiator, or preferably under vacuum. There can also be operated under a pressure higher than the atmospheric pressure.

The following examples are meant to illustrate the process according to the invention without limiting its scope in any way.

EXAMPLE 1

4 grams butyl rubber containing 1.2% isoprene units are introduced into a reactor under vacuum and dissolved in a mixture consisting of 100 cc methylcyclohexane (distilled on $P_2O_5$ and sodium), 100 cc methylene chloride (processed with sulphuric acid and distilled on $P_2O_5$ and sodium), 2.6 cc indene (purified up to 99.8% by reaction with sodium amide, then regneration of indenylsodium by water) and $2.10^{-3}$ mole tertiobutylchloride distilled on $P_2O_5$. Polymerization of indene is initiated by introducing $2.10^{-3}$ mole monochlorodiethylaluminium at $-50°$ C. Reaction is stopped after 30 minutes by adding 10 cc tetrahydroranne. The polymer is precipitated in 1000 cc ammoniated acetone, recovered by filtration on a gooch and dessicated under vacuum in an oven. Non-grafted elastomer is extracted in a soxhlet by means of hexane and homopolymer is separated in the same way by means of dioxanne.

The yield of polyindene is 50%. The resulting product contains 18% homopolyindene, 50% non-grafted elastomer and 32% grafted copolymer comprising 20.6% indene units.

EXAMPLE 2

4 grams terpolymer ethylene-propylene-hexadiene-1.4 (NORDEL) containing 30% propylene are dissolved in a mixture consisting of 100 cc methylcyclohexane, 100 cc methylene chloride, 2 cc indene and $8.10^{-3}$ mole tertiobutylchloride. These materials have been purified under the condtions of previous example. Polymerization is initiated by introducing $2.10^{-3}$ mole monochlorodiethylaluminium at $-30°$ C. Reaction is stopped after 2 minutes by adding 10 cc tetrahydrofuranne. Separation processes are then conducted as in example 1.

The yield of polyindene is 100%. The resulting product contains 25% homopolyindene, 20% non-grafted elastomer and 55% grafted copolymer comprising 14.3% indene units.

EXAMPLE 3

4 grams terpolymer ethylene-propylene-ethylidene norbornene containing 3% unsaturated units and 50% propylene (E.P.D.M. ESSO 2504) are introduced into a reactor and dissolved under vacuum in a mixture consisting of 100 cc methylcyclohexane, 100 cc methylene chloride, 2 cc indene and $2.10^{-3}$ mole tertiobutylchloride. These materials have been purified under the conditions of previous example. Polymerization is initiated by introducing $2.10^{-3}$ mole monochlorodiethylaluminium at $0°$ C.

The polymer is recovered and processed as in example 2.

The yield of polyindene is 100%. The resulting product contains 17% homopolyindene, 6% non-grafted elastomer and 77% grafted copolymer comprising 21.2% indene units.

The average number molecular weight of the grafted copolymer, as measured by means of osmometry in toluene at $25°$ C, is 62,000 whereas that of the starting terpolymer is 52,000.

EXAMPLE 4

6 grams terpolymer E.P.D.M. ESSO 2504 are dissolved under vacuum in a mixture consisting of 150 cc methylcyclohexane, 150 cc methylene chloride, 4 cc indene and $3.10^{-3}$ mole tertiobutylchloride. These materials have been purified under the conditions of previous example. Polymerization is initiated by introducing $5.10^{-3}$ mole titanium tetrachloride at $-30°$ C. Reaction is stopped after 1 hour by adding 5 cc methanol. The polymer is processed as in example 1.

The yield of polyindene is 50%. The resulting product contains 6% homopolyindene, 51% non-grafted elastomer and 43% grafted rubber.

EXAMPLE 5

20 grams terpolymer E.P.D.M. ESSO 2504 are introduced into a reactor and dissolved under vacuum in a mixture consisting of 500 cc methylcyclohexane, 500 cc methylene chloride, 24.5 cc indene and $9.10^{-3}$ mole tertiobutylchloride. These materials have been purified under the conditions of previous example. Polymerization is initiated by introducing $5.10^{-3}$ mole monochlorodiethylaluminium at $0°$ C. Reaction is stopped after 5 minutes by adding 20 cc tetrahydrofuranne. The polymer is processed as in example 1.

The yield of polyindene is 100%. The resulting product contains 40% homopolyindene, 8% non-grafted elastomer and 52% copolymer comprising 28.9% indene units.

The average number of molecular weight of this copolymer is 89,000.

The grafted polymer, to which has been incorporated 0.2% antioxidant (TOPANOL) can be processed by compression moulding and has an ultimate tensile strength of 122 kg/cm2 and an ultimate elongation of 253% at 25° C.

EXAMPLE 6

4 grams terpolymer ethylene-propylene-ethylidene norbornene containing 9.4% unsaturated units and 55% propylene (DUTRAL TER 0.54 EM MONTEDISON) are introduced into a reactor and dissolved under vacuum in a mixture consisting of 100 cc methylcyclohexane, 100 cc methylene chloride, 9.5 cc indene and $2.10^{-3}$ mole tertiobutylchloride. These materials have been purified under the conditions of previous example. Polymerization is initiated by introducing $2.10^{-3}$ mole titanium tetrachloride at 0° C. Reaction is stopped after 35 minutes. The polymer is recovered and processed as in example 1.

The yield of polyindene is 58%. The resulting product contains 40% homopolyindene, 19% non-grafted elastomer and 41% grafted copolymer.

EXAMPLE 7

4.9 grams terpolymer DUTRAL TER 0.54 E.M. MONTEDISON are introduced into a reactor and dissolved under vacuum in a mixture consisting of 200 cc methylcyclohexane, 2.5 cc indene and $2.10^{-3}$ mole tertiobutylchloride. These materials have been purified under the conditions of example 1. Polymerization is initiated at −30° C by introducing $2.10^{-3}$ mole monochlorodiethylaluminium, then the mixture is allowed to warming up to the temperature of +5° C at which reaction is completed during 10 minutes.

The polymer is recovered and processed as in example 1.

The yield of polyindene is 76%. The resulting product contains 16.1% homopolyindene, 26.2% non-grafted elastomer and 57.7% gafted copolymer. The average number molecular weight of the grafted copolymer, as measured by means of osmometry in toluene at 25° C, is 99,000 whereas that of the starting terpolymer is 80,000.

EXAMPLE 8

4 grams terpolymer DUTRAL TER 0.54 E.M. MONTEDISON are introduced into a reactor and dissolved under vacuum in a mixture consisting of 100 cc methylene chloride, 100 cc methylcyclohexane, 19.7 cc styrene and $2.10^{-3}$ mole tertiobutylchloride. The reaction is initiated at 0° C by introducing $2.10^{-3}$ mole monochlorodiethylaluminium and is completed during 10 seconds.

The polymer is recovered and processed as in example 1.

The yield of polystyrene is 50.7%. The resulting product contains 9.7% homopolystyrene, 8.3% non-grafted elastomer and 82% grafted copolymer.

EXAMPLE 9

3 grams poly-cis-butadiene-1,4 are introduced into a reactor and dissolved under vacuum in a mixture consisting of 100 cc methylene chloride, 100 cc methylcyclohexane, 7% indene and $4.10^{-3}$ mole tertiobutylchloride. These materials have been purified under the conditions of example 1. Polymerization is initiated at −20° C by introducing $2.10^{-3}$ mole titanium tetrachloride, then the mixture is allowed to warming up to the temperature of +10° C at which reaction is completed during 30 minutes. Reaction is stopped by addition of methanol then the polymer is recovered and processed as in example 1.

The yield of polyindene is 85%. The resulting product contains 10% by weight of part (non-grafted elastomer) which is soluble in methylcyclohexane at room temperature and 90% of an insoluble part (homopolyindene and grafted elastomer).

EXAMPLE 10

3.8 grams poly-cis-butadiene-1,4 are introduced into a reactor and dissolved under vacuum in a mixture consisting of 200 cc methylene chloride and 7 cc indene. Polymerization is initiated at +20° C by introducing $3.610^{-3}$ mole titanium tetrachloride, then the mixture is allowed to cooling down to the temperature of 0° C at which reaction is completed during 20 minutes. Reaction is stopped by addition of methanol then the polymer is recovered and processed as in example 1.

The yield of polyindene is 100%. The resulting product contains 12% by weight of a part (non grafted elastomer) which is soluble in methylcyclohexane at room temperature and 88% of an insoluble part (homopolyindene and grafted elastomer).

What is claimed is:

1. A process for preparing copolymers wherein a macromolecular hydrocarbon elastomer having a non-halogenated alkyl or branched alkyl double-bonded chain and a vinylaromatic monomer selected from the group consisting of indene, styrene and styrene having at least one alkyl substituent are reacted at a temperature from −80° C to +40° C in the presence of $5.10^{-4}$ to $5.10^{-2}$ mole/l of a Lewis acid initiator and optionally in the presence of a co-initiator.

2. Process according to claim 1 wherein the Lewis acid initiator is selected from titanium tetrachloride, butoxytrichlorotitanium, monochloro-diethylaluminium, dichloromonoethylaluminium, boron trifluoride and boron trichloride.

3. Process according to claim 1 wherein the co-initiator is selected from alkylchlorides and alkylarylchlorides.

4. Process according to claim 1 wherein reaction occurs in a solvent mixture consisting of a hydrocarbon and a hydrocarbon halogenated derivative selected from the group consisting of methylene chloride, dichloro - 1.1 - ethane, ethylchloride and dichloro - 1.2 - ethane.

* * * * *